Feb. 14, 1933.  A. McNAB  1,897,581
COMBINED SHOCK ABSORBER AND JACK FOR VEHICLES
Filed Nov. 21, 1927  4 Sheets-Sheet 1
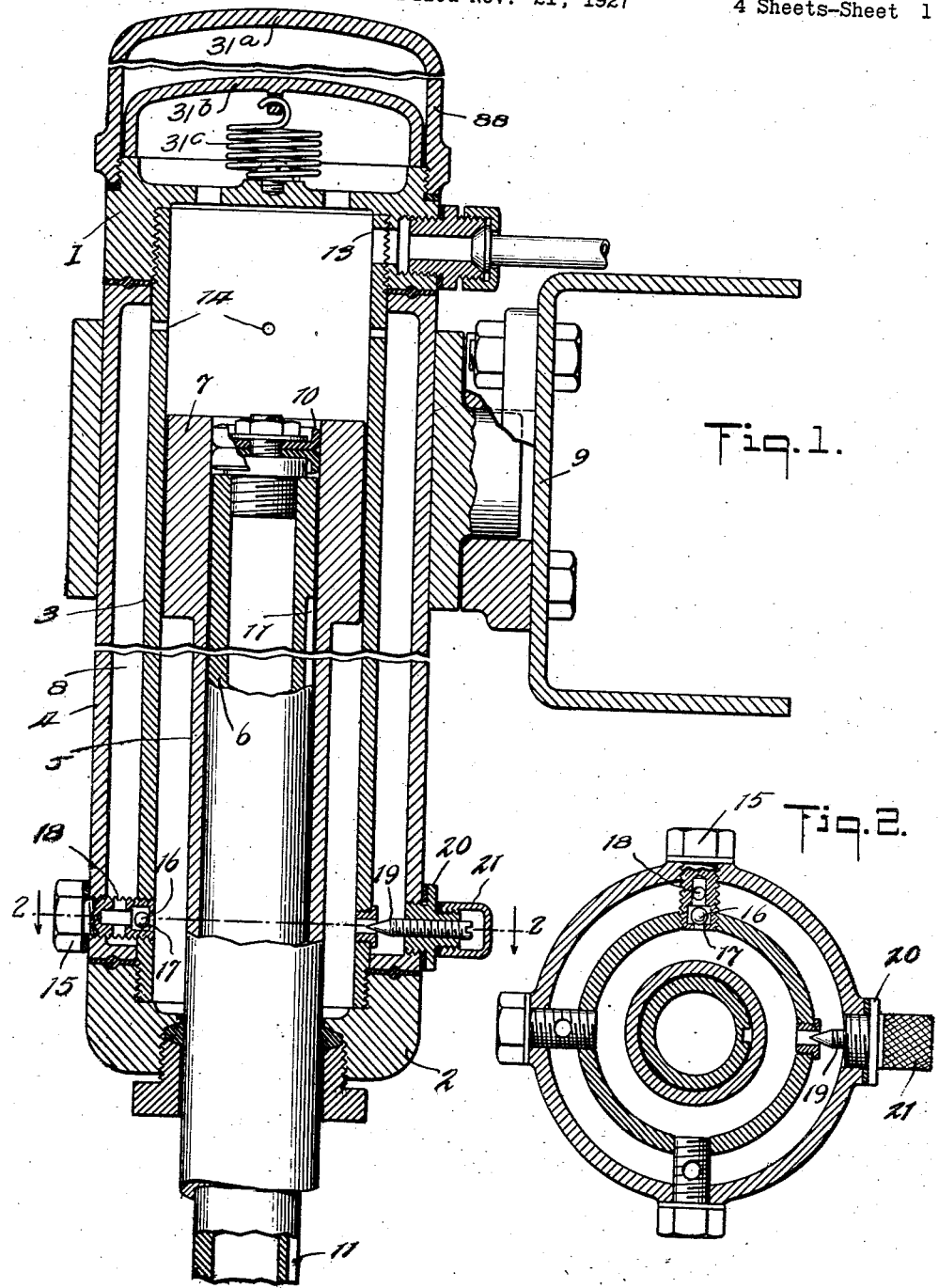
Inventor
ALEXANDER MC. NAB
by his attorneys
Marks & Clerk Feb. 14, 1933.  A. McNAB  1,897,581
COMBINED SHOCK ABSORBER AND JACK FOR VEHICLES
Filed Nov. 21, 1927   4 Sheets-Sheet 2

Inventor
ALEXANDER Mc.NAB
by his attorneys
Marks & Clerk

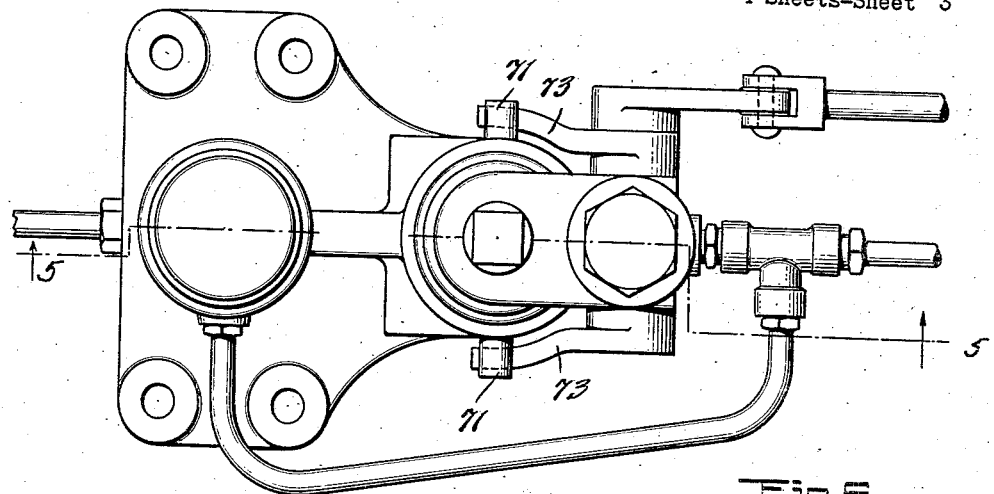
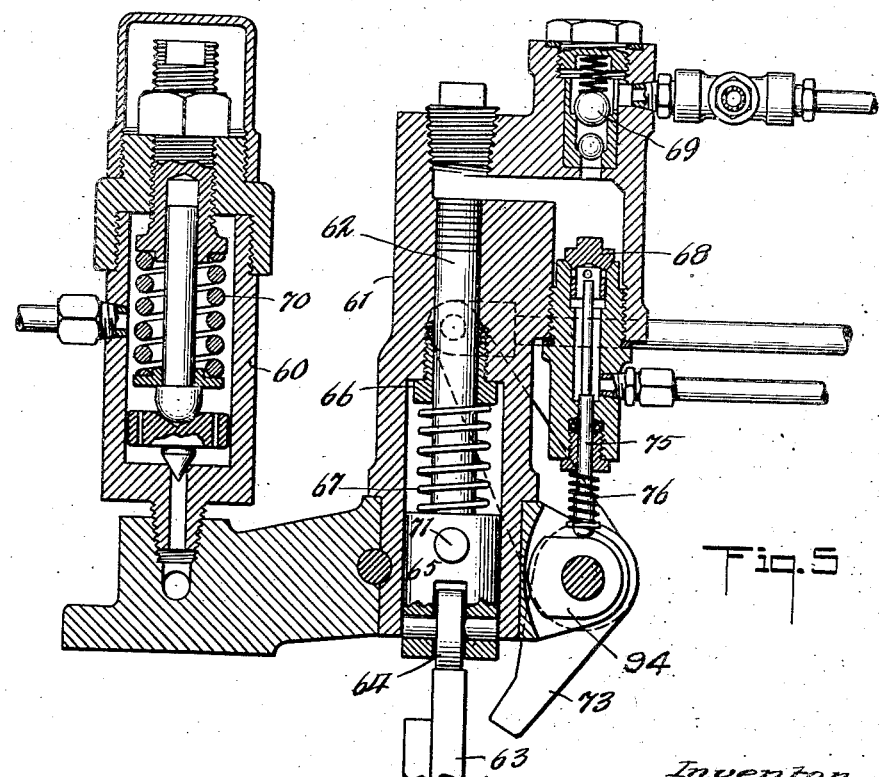

Feb. 14, 1933. A. McNAB 1,897,581
COMBINED SHOCK ABSORBER AND JACK FOR VEHICLES
Filed Nov. 21, 1927 4 Sheets-Sheet 4
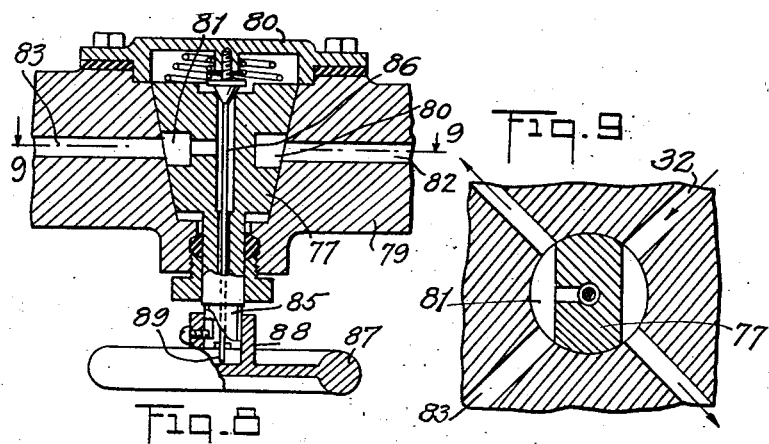
Inventor
ALEXANDER Mc.NAB
by his attorneys
Marks & Clerk Patented Feb. 14, 1933

1,897,581

UNITED STATES PATENT OFFICE

ALEXANDER McNAB, OF BRIDGEPORT, CONNECTICUT, ASSIGNOR TO McNAB ABSORBO-LIFT, INC., OF NEW YORK, N. Y., A CORPORATION OF NEW YORK

COMBINED SHOCK ABSORBER AND JACK FOR VEHICLES

Application filed November 21, 1927. Serial No. 234,629.

This invention relates to jacks and shock absorbers operated by fluid pressure and specifically to a device in which such a jack functions also as a shock absorber.

Automotive vehicles are very commonly fitted with shock absorbers of various kinds among the most efficient of which are those employing a fluid under pressure to cushion the effects of road shocks. Such devices are continuously in operation and are subjected to very severe shocks and rapid vibration. It is obvious, therefore, that the simpler the structure of the jack and the fewer the moving parts the less will be the wear on the jack and the more efficient will be its functioning. For these reasons, shock absorbers comprising merely a cylinder mounted on the frame and tight fitting pistons working in the cylinder and attached to the axle or car spring have found wide favor. Such shock absorbers are necessarily of considerable dimensions.

It is also necessary to provide automotive vehicles with means for raising a wheel off the ground whether or not pneumatic tires are used since the wheels in a car and the car spring are about the most vulnerable parts of the chassis and suffer more damage than any other part.

The chance of accident is much increased by the use of pneumatic tires, which, of course, are liable to be punctured or blown-out or require to be changed for various reasons. Jacks, for raising the axle off the ground either to repair or change the tire or wheel, or effect repairs to broken springs are necessarily somewhat unwieldy, and in the case of large vehicles such as long distance buses fitted with large size tires, extremely so, since the weight to be lifted may be in the neighborhood of a ton, and manual operation of such jacks is extremely heavy labor under the most favorable circumstances. Further, it is often practically impossible, due to the softness of the ground into which a wheel has sunk, to get a jack into position between the axle and the ground.

For these and other reasons, a device permanently mounted on the axle adjacent the car wheels and substantially of no greater dimension than the cylinder and piston type of shock absorber which will also act to raise the axle of a car when necessary, provides a very valuable auxiliary to the operation of automotive vehicles and especially so in operating heavy vehicles of this type.

The object of the present invention is to provide in one device a hydraulic shock absorber of the type commonly used on automotive vehicles combined with a hydraulic jack.

A further object of the invention is to provide a combined shock absorber and jack in which the working of the device as a jack to raise any or all wheels of a vehicle may be controlled from a common point such as from the driving seat of an automobile.

A further object of the invention is to provide improved means for supplying or withdrawing fluid to the combined shock absorber and jack, such means comprising various novel features as will hereinafter be fully described.

A further object of the invention is to provide a control system for devices operated by fluid pressure which comprises the novel feature that pressure existing in the system is made use of to ensure tight closing of control means and means are provided for releasing said pressure when it is desired to manipulate said pressure control system.

A further object of the invention is to provide a combined shock absorber and jack device of a simple and robust construction and neat appearance.

Still further objects of the invention will hereinafter be described and be specifically pointed out in the claims appended hereto.

The device is illustrated in preferred forms in the accompanying drawings, but in view of the novel nature of the invention, it is particularly desired to point out that the invention is in no way limited by the illustrated embodiments thereof, but only by the scope of the appended claims.

In the accompanying drawings:—

Fig. 1 is a sectional elevation of the upper portion of a preferred form of shock absorbing unit.

Fig. 2 is a section on line 2—2 of Fig. 1.

Fig. 5 is a sectional elevation on line 5—5 of Fig. 6, illustrating a preferred form of pump mechanism for use in operating the jacks.

Fig. 6 is a plan of the device illustrated in Fig. 5.

Fig. 7 is an elevation of part of the pump.

Fig. 8 is a horizontal section of a preferred form of control valve, and

Fig. 9 is a section on line 9—9 of Fig. 8.

In the figures, similar numerals indicate similar parts.

Figure 3:
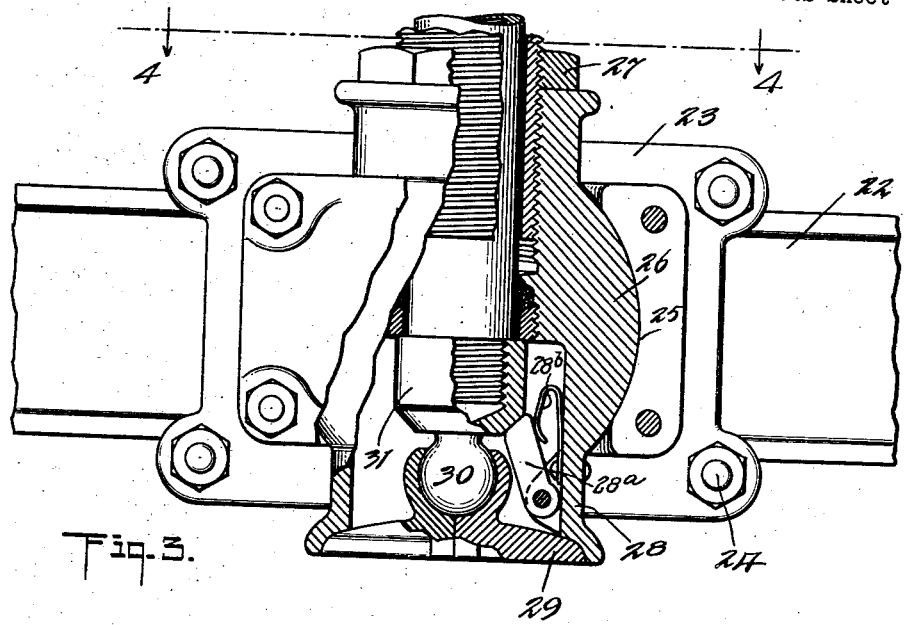
Fig. 3 is a sectional elevation of the lower portion of the unit illustrated in Figs. 1 and 2.

The extension of the jack is effected by fluid under pressure but retraction of the jack is effected by release of said pressure, the effect of atmospheric pressure and the weight of the car, aided if necessary, by a spring, since by this means no return conduits for the working fluid need be provided, a single pipe to each device serving to supply pressure fluid to the jack or enable it to be returned to the pump.

Referring to Figs. 1 to 4, 1 and 2 are top and bottom caps screwed on a liner member 3, having a right hand thread at one end and a left hand thread at the other, the end caps gripping between them a body member 4, which is cored out to provide an auxiliary chamber or conduit 8 for the passage of pressure fluid. Within the liner 4, member 3, are arranged the nested pistons 5 and 6, the former of which is provided with a piston head 7 of greater diameter than the stem, the stem or reduced portion being cylindrical and of substantial diameter in relation to the cylinder formed by member 3. The inner piston 6 has a close fit throughout its length within the outer piston 5 and carries pump washers 10 at its upper end. The inner piston is provided with a groove 11 in its outer surface into which a pin (not shown in the drawings) projects and serves to limit the outward movement of the inner piston. It will be understood that said pin is provided on the lower portion of the piston 5 and projects inwardly from the wall of the stem portion of said piston. An oil inlet 13 is drilled through the end cap and liner at the upper end of the piston while oil ducts 14 are drilled through the liner and afford communication between the space above the head of the outer piston of the cylinder and the oil space 8 between the body member and the liner 3.

Provision is made for the passage of oil from the oil space 8 to the space below the head of the outer piston by means of a hollow stud 15 screwed into a threaded bore in the body member and liner, a ball 16 being held in the inner end of the hollow bolt by the screwed and scalloped ring 17, which in known manner is shaped such that it will retain the ball in the hollow stud without allowing the ball to close communication between the interior of the plug and the said space below the piston head, when the ball is driven by the flow of fluid against said ring 17. Holes 18 are drilled through the side of the stud to connect the bore of the stud with the space 8. It will be understood however that the ball 16 prevents flow of oil through the hollow stud 15, from the space below the piston 7 to the auxiliary chamber. Obviously a number of these valve plugs may be arranged around the body of the conduits in order to enable oil to freely enter the space between the liner and the outer cylinder.

To control the outflow of oil from the space between the outer piston and the liner, one or more conical screw plugs 19 are arranged as shown in Fig. 2 these plugs screw into seating members 20 screwed into the body of the device, the lugs 19 are provided with grooves in their outer ends whereby they may be readily adjusted by a screw driver, and their projecting ends are protected by caps 21 screwed onto said seating member 20. The rate at which oil flows from the space between the cylinder and the lining may by this means be readily adjusted. The lower end of the cylinder is closed by an ordinary stuffing box construction. The means described thus enable the outer piston to move rapidly upwards but to move more slowly downwardly.

Any desired proportion of the weight of the spring axles, and wheels of the car may be taken by a spring of the strength desired arranged between the head of the outer piston and the end of the liner and the provision of such a spring is, of course, an optional matter depending on the results of experience with the particular make of car and the characteristics of its spring suspension.

Figure 4:
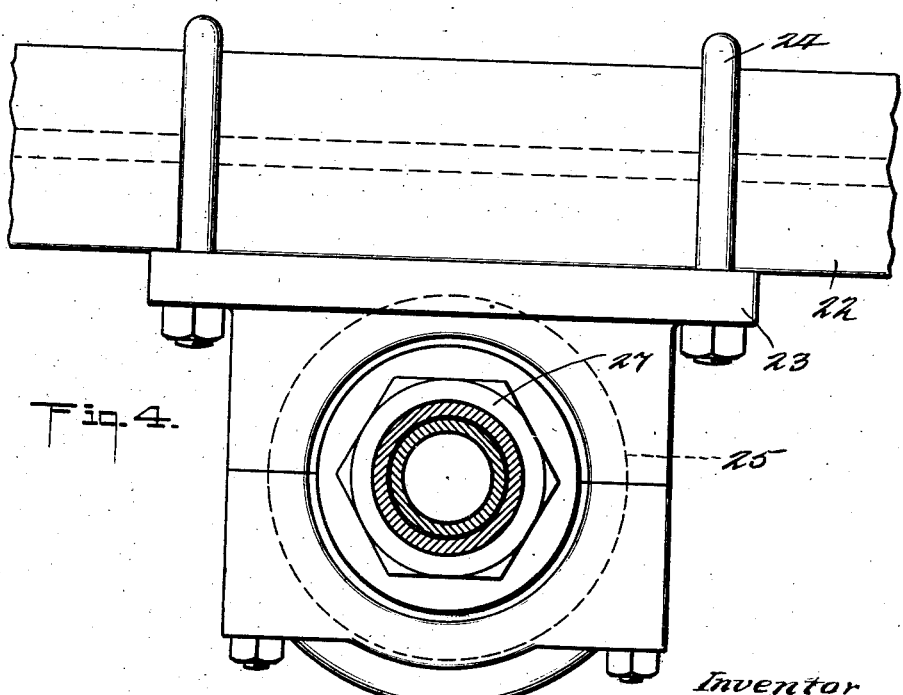
Fig. 4 is a section on line 4—4 of Fig. 3.

The outer piston is adapted to be permanently connected to the car axle by the arrangement illustrated in Figs. 3 and 4, in which 22 is the axle and 23 is an attachment adapted to be clamped on the axle by bolts 24. This member 23 is formed in two pieces and contains a spherical recess 25 in which is received the spherical member 26, in which the end of the outer piston is screwed, being held in position by lock nut 27. This spherical member is preferably provided with a tubular extension member 28. The inner piston projects through and below the outer piston and at its end carries a foot 29 by a ball and socket joint 30, the ball preferably being formed on a cap member 31 screwed on the threaded end portion of the piston 6, the upper end of the cap member 31 forming a projecting shoulder which is adapted to engage the piston 5 to limit the inward movement of the piston 6.

The foot of the inner member is adapted to be drawn against the end of the tubular extension 28 thus forming a neat and dust proof closure.

Pivotally mounted between lugs formed on the extension member 28 is a catch member 28a. A leaf spring 28b secured at one end to member 28 has its other end bearing against the free end of the catch member 28a and serving to urge said member outwardly into engagement with the cap member 31 or lower end of the inner piston 6. The end of the catch member 28a has an inclined surface which, when the inner piston 6 is in retracted position, bears against a correspondingly inclined shoulder on the cap member 31. It will be appreciated that when sufficient downward pressure is applied to the inner piston 6 the cap member 31 will force the catch member 28a towards the right of Fig. 3 to permit said cap member 31 to descend, the catch member 28a then sliding along the surface of the projecting portion of piston 6. On a return inward movement of the piston 6 the side of catch member 28a, which has an inclined relation to the piston 6, will ride over the upper edge of the cap member 31, and when the piston 6 is fully retracted, the inclined end of the catch member 28a will again engage with the inclined shoulder on the lower part of cap member 31.

The action of the device in this form will be as follows:—

Assuming that when the device is functioning as a shock absorber, that is to say that the pressure in the space above the piston heads is low and the inner piston is drawn up and held in retracted position, it is desired to use the device as a jack. The pump is put into operation and the pressure fluid is forced into the cylinder. The oil will be put under pressure in the cylinder and in the oil space 8 and in the space under the piston head of the outer piston.

The difference in area between the lower surface of said piston head and the upper surface is small and the force tending to cause protrusion of the outer piston would be accordingly small and would not have any particular effect in causing any raising of the car, but the inner piston, being subjected to the full pressure over the whole of the top rapidly moves downward as soon as the pressure value has risen above that necessary to force the inner piston out of engagement with its retaining means, until it reaches the ground, after which the cylinder 3 and outer piston 5 are forced upwardly by the pressure acting between the top of the piston and the inside of the cylinder end.

A coil spring may be provided between the underside of the outer piston and the end member 2 for exerting an upward pressure on said outer piston sufficient to balance the weight of the axle assembly of the vehicle, in order to insure that the axle and vehicle spring will move upwardly with the vehicle chassis when the inner piston is further extended after having been moved downwardly into contact with the road surface. In the fully extended position of the spring, the pressure in the cylinder would be equal to that of the portion of the weight of the car borne by the jack say 1,000 pounds per square inch.

When it is desired to retract the jacking piston 6, the cock controlling the flow of pressure fluid to the device is reversed, the cylinder space being connected to the inlet valve of the pump. Oil is thereby sucked from the cylinder, the weight of the car forcing the inner and outer pistons upwardly relative to the body member 4 and liner 3 until the springs take up the load of the car, pumping from the cylinder is continued, producing reduction of pressure above the inner piston and causing the inner piston to complete its inward movement under the influence of the external atmospheric pressure and to slide over the retaining catches which completion of the inward movement of the piston may be indicated or may automatically effect the disconnection of the pump, leaving the cylinder spaces full of oil to the level of the top of the piston heads.

The device is now ready to function again as a shock absorber, the functioning of the device in this capacity being as follows: Presuming the car is put in motion and a wheel hits a bump. The inner and outer pistons will be driven into the cylinder, the inner piston moving with the outer piston by reason of the grip of the catch members. If the blow is a severe one as in the case of a heavy car moving at fast speed which might easily be the case, the inner piston might be driven out of engagement with the catch members. This condition could be automatically indicated and remedied by setting the pump to create a partial vacuum in the cylinder or the reduced pressure in a cylinder on the rebound of the springs causing the outer piston to move outwardly might lower the pressure in the cylinder sufficiently to cause the inward movement of the inner piston to effect its relatching.

During the movement being described, the inward movement of the two pistons or the outer piston alone forces oil from the cylinder through the ducts 14.

Oil passing through the ducts flows through space 8 and through hollow bolts 15 practically freely. On passing over the bump the springs rebound dragging down the piston or pistons at a rate depending on the setting of the tapered plug and flows back into the cylinder above the piston heads.

The oil displaced by the upward movement of the pistons is several times greater than that displaced by the downward movement since in the latter case only the under side of the head of the outer piston is acting on the oil, and it is necessary to provide a quantity of air or pneumatic fluid within the unit. In Fig. 1 the member 1 is provided with a cap member 31a which serves as an air vessel and which communicates with the interior of the liner or piston cylinder 3 by way of apertures in the member 1. A piston 31b slidable within the cap 31a and yieldingly urged towards member 1 by a spring 31c may be provided if desired, in order to increase the resiliency of the shock absorbing action. Or alternatively the use of air may be dispensed with, and the part of the cap member 31a which is beneath the piston 31b may be filled with hydraulic fluid.

A form of pump which I prefer to employ will now be described with reference to Figs. 5, 6 and 7. This pump comprises a relief valve 60 arranged to by-pass the pressure fluid when the jacks are fully extended or for any reason the pressure in the system rises beyond a certain predetermined maximum value. This pump comprises a cylinder 61 in which a plunger 62 is reciprocated in a suitable manner for instance, by a cam 63 acting on a roller 64 and mounted in a cross head 65, the plunger 62 passing through the usual stuffing gland 66, and resting on the head 65. A spring 67 arranged between gland 66 and cross head 65 acts to hold roller 64 against the surface of the cam 63. The pump is provided with an inlet valve 68 of special construction as will be hereinafter described and an outlet valve 69. On the pressure in the system rising above a maximum value determined by the setting of the relief valve spring 70, Fig. 5, pressure fluid will be by-passed around the pump as is well understood. In order to render the pump inoperative, when no further operation of the jack or jacks is required, I provide for raising roller 64 out of contact with the cam 63 by the following mechanism:—

A pin 71 fitted in the cross head 65 projects through a slot 72 in the pump frame. This pin is adapted to be engaged by the short arm 73 of the crank lever 74 which may be operated from any suitable point. Obviously, some means of relieving the pressure in the pump must be provided to enable the pin 71 to be raised. These means are associated with the inlet valve 68, and as shown in Fig. 5 comprise a cam 94 turning with the crank lever, a rod 75 riding on this cam bears against the valve head 68 controlling the inlet valve, a spring 76 being arranged between a flange mounted on this rod 75, and a housing for the mechanism in order to insure that the rod follows the contour of the cam, the rod being of such a length as to be out of contact with member 68, while riding on the low portion of the cam, but on the high portion being brought under the end of the rod, which occurs previously to the engagement of the short arm 73 with the pin 71, the rod engages the valve member 68, and raises it off its seat thus releasing the pressure in the pump chamber.

A further feature of the invention to which attention will now be directed, resides in the means adopted to enable the plugs of the cocks controlling the flow of the pressure fluid to the jacks to be easily operated. It will be understood that these cocks may be mounted in a recess in the floor of the vehicle, or on the instrument panel, or in any position where they may be operated conveniently by the driver. It is pointed out that the pressure in the pressure fluid system is for a car of weighing say about a ton, in the neighborhood of between two and three thousand pounds to the square inch. Such pressures give rise to problems of a special kind.

The plugs 77 are of tapered section fitting in tapered bores 78 in a valve housing 79 and the ends of these bores are closed to prevent loss of oil by a cap 80.

The result of the tapered section is of course that the ends of the plugs are of different diameter. A certain amount of leakage between the valve housing and the surface of the valves is unavoidable due to the high pressures existing and the result is that a high pressure builds up between the plug ends, and the end of the valve housing 80, the valve of the resultant pressure due to the difference in area of the two ends of the plug multiplied by the pressure, may amount to several hundred pounds.

Obviously, with such a pressure acting on the tapered plug body 77, the friction developed between the plug and the housing is enormous and may seize the plug in the housing making it practically impossible to turn the plug. On the other hand, this pressure also may serve a useful purpose in effecting a tight sealing of the plug in adjusted position. In order to release this pressure when moving the plug, I provide the following mechanism:—

As shown in Fig. 8, 77 indicates the tapered valve plug provided with cutouts 80, 81, registering with the supply and delivery pipes 82, 83. The plug is fitted in a tapered bore and a spring 84 is arranged between the end of the plug and the cap 80 closing said bore, the spring acting to seat the plug snugly in the bore when the fluid system is free from pressure.

The plug terminates in a squared stem 85 projecting to the front of the surface behind which the valves are mounted.

A hole 86 is drilled axially through the plug and extends through the stem 85. The stem may be squared to take a small hand wheel 87, the hand wheel being provided with a socket adapted to fit over the end of the stem 85 and formed in a boss 88, against the inner surface of which the projecting end of a rod 89 engages. The rod 89 carries at its inner end a valve head 90 against which the spring 84 acts to normally close the bore 86. When it is desired to turn the plug, the wheel 87 is first moved axially toward the plug thereby raising the valve head 90 from its seat and enabling any pressure fluid accumulated at the end of the valve to enter the bore 86. A branch bore 91 affords communication between the bore 86 and the low pressure or outlet pipe 83. By these means, the pressure acting on the plug is reduced to that due to the spring 84, which need be no more than a few pounds, thereby enabling the plug to be readily turned. On releasing the wheel 87, the spring 84 again seats the valve head 90 closing the bore 86 and enabling pressure to build up acting to wedge the plug in the tapered bore thus preventing any leakage of the pressure fluid round the valve into the low pressure pipe.

The invention is not in any way restricted to the arrangement or form of the parts shown.

Various modifications of the attachment between the axle and the pistons and for detachably retaining the inner and outer pistons in nested relation during the shock absorbing function of the device may be effected.

While the combined shock absorbers and jacks may with great convenience be operated from a common point such as the driver's seat since they are, of course, easily supplied from a common source such as a pump driven by the engine of the vehicle, I do not desire to limit myself to such a central control since it would be feasible and possibly desirable under certain circumstances to operate the devices individually, that is, to provide means associated with each, which could be manually operated to force fluid such as oil contained in a reservoir within the device or elsewhere, into the cylinder when it is desired to bring into play the jacking function of the device. It is desired to point out, however, that the central supply of the device has a further important advantage in that it enables the pressure fluid to be readily heated to any desired degree in order that the functioning of the device will be uneffected by the coldest weather. For this purpose, a small cold weather valve tap could be arranged to enable warm oil to circulate continuously through the devices. The oil, since it reaches all working parts of the device, would serve very efficiently to keep the parts at a temperature such that freezing together of the working surfaces would not occur and thickening of the oil to a degree interfering with the functioning of the device would be avoided.

The scope of the invention is not, therefore, limited in any way to the illustrated and described embodiment, but only by the scope of the appended claims.

What I claim is:—

1. In a jack construction for road vehicles, the combination of an outer enclosure for mounting on the vehicle; said outer enclosure having a cylinder therein; jacking piston means operative within said cylinder for movement from an inward position therein to an outward position for engaging the road surface; said outer enclosure having associated therewith a supply opening for the supply to said cylinder of fluid under pressure and the withdrawal therefrom of said fluid, for effecting respectively inward and outward movement of said piston means; and a yielding catch device associated with said cylinder and piston means for normally retaining said piston means in the inward position.

2. In a jack construction for road vehicles, the combination of an outer enclosure for mounting on the vehicle; said outer enclosure having a cylinder therein; jacking piston means operative within said cylinder for movement from an inward position therein to an outward position for engaging the road surface; said outer enclosure having associated therewith a supply opening for the supply to said cylinder of fluid under pressure and the withdrawal therefrom of said fluid, for effecting respectively inward and outward movement of said piston means; a yielding catch device associated with said cylinder and piston means for normally retaining said piston means in the inward position; said catch device including a catch member for engaging said piston means with inclined surfaces, whereby said piston means can be forced past said catch member.

3. In a jack construction for road vehicles, the combination of an outer enclosure for mounting on the vehicle; said outer enclosure having a cylinder therein; means displaceable within said cylinder from an inward position to an outward position in engagement with the road surface; said outer enclosure having associated therewith a supply opening for the supply to said cylinder of hydraulic fluid, for effecting respectively inward and outward movement of said inner means; said cylinder having on the lower end thereof a recess open at the bottom; a yielding catch device within said recess for normally retaining said inner means in inward position; and a foot on said inner means adapted in the outward position of said means to engage the road surface and in the inward position thereof to close the opening of said recess.

4. In a combined jack and shock absorber for vehicles; the combination of an outer cylinder for connection with one part of the vehicle; outer piston means operative in said outer cylinder and for connection with another part of the vehicle; inner piston means operative in said outer piston means; yieldable means adapted for normally locking said inner piston means to said outer piston means for causing said inner piston means to participate in shock absorbing movement of said outer piston means; said yieldable means permitting said inner piston means to move relative to said outer piston means when said inner piston means is subjected to predetermined pressure.

5. In a combined jack and shock absorber for vehicles; the combination of an outer cylinder for connection with one part of the vehicle; outer piston means operative in said outer cylinder and for connection with another part of the vehicle; inner piston means operative in said outer piston means; said outer piston means having at the lower end thereof a recess open at the bottom; said inner piston means having a lower portion extended through the lower end of said outer piston means and provided with an inclined surface; a catch member mounted in said recess and engageable with said inclined surface; spring means tending to hold said catch member in engagement with said inclined surface for normally preventing outward movement of said inner piston means relative to said outer piston means; means for limiting inward movement of said inner piston means relative to said outer piston means; and a foot member on the lower end of said inner piston means for engaging the ground in extended position of said inner piston means and for closing said opening of said recess.

6. In a combined jack and shock absorber for road vehicles, having an outer piston cylinder and nested piston means therein adapted respectively for connection with an axle of the vehicle and for movement into contact with the road surface; the provision of means adapted for connecting said outer piston cylinder with the chassis of the vehicle; means for connecting the outer of the two piston means with the axle of the vehicle; means normally causing said inner piston means to move as a unit with said outer piston means; and means enabling said inner piston means to be extended outwardly beyond said outer piston means into contact with the road surface.

7. In a combined jack and shock absorber for vehicles, the combination of an outer cylinder for mounting on the vehicle chassis; outer shock absorbing piston means operative in said outer cylinder; means for connecting said outer piston means with an axle of the vehicle; an inner jacking plunger operative in a cylinder formed in said outer piston; said inner plunger having a lower portion extending through the lower end of said outer piston means.

In testimony whereof I have affixed my signature.

ALEXANDER McNAB.